United States Patent
Karjanlahti

(10) Patent No.: US 7,792,935 B2
(45) Date of Patent: Sep. 7, 2010

(54) IP BASED VOICE COMMUNICATION IN A MOBILE COMMUNICATIONS SYSTEM

(75) Inventor: Juha Karjanlahti, Espoo (FI)

(73) Assignee: Nokia Corporation, Espoo (FI)

( * ) Notice: Subject to any disclaimer, the term of this patent is extended or adjusted under 35 U.S.C. 154(b) by 1049 days.

(21) Appl. No.: 10/204,015

(22) PCT Filed: Dec. 13, 2001

(86) PCT No.: PCT/FI01/01093

§ 371 (c)(1),
(2), (4) Date: Dec. 17, 2002

(87) PCT Pub. No.: WO02/51072

PCT Pub. Date: Jun. 27, 2002

(65) Prior Publication Data

US 2003/0187926 A1    Oct. 2, 2003

(51) Int. Cl.
*G06F 15/173* (2006.01)
(52) U.S. Cl. ............. 709/223; 709/224; 370/340; 370/390; 370/493
(58) Field of Classification Search ............... 709/223, 709/224; 455/416, 435, 518–520, 521; 370/340, 370/351–356, 390, 493–495
See application file for complete search history.

(56) References Cited

U.S. PATENT DOCUMENTS

| 5,752,003 | A | 5/1998 | Hart |
| 6,128,483 | A * | 10/2000 | Doiron et al. ............... 455/419 |
| 6,252,952 | B1 * | 6/2001 | Kung et al. ............... 379/114.1 |
| 6,298,058 | B1 * | 10/2001 | Maher et al. ............... 370/390 |
| 6,338,089 | B1 * | 1/2002 | Quinlan ............... 709/227 |
| 6,798,751 | B1 * | 9/2004 | Voit et al. ............... 370/252 |

(Continued)

FOREIGN PATENT DOCUMENTS

EP    1 083 724    3/2001

(Continued)

OTHER PUBLICATIONS

EPT WG3 (98) 005. DRAFT proposal. Version: 0.0.14, Date: Nov. 1998. Radio Equipment and Systems (RES); Terrestrial Trunked Radio (TETRA); Voice plus Date (V+D); TETRA packet data. XP014041454. (110 pages).

*Primary Examiner*—Thuong T Nguyen
(74) *Attorney, Agent, or Firm*—Harrington & Smith

(57) ABSTRACT

An IP-based group communication feature in a mobile communication network is based on the pre-established logical connections established between a gateway node (GGSN) and members of a group in the mobile communication network. No separate call establishment procedures using VoIP signaling are used for connecting a user equipment (UE) logically to group(s), but the procedure is preferably based on the normal logical connection establishment signaling (e.g. PDP context creation) as used for data service. The UE implements a host supporting the IP multicasting, and the next IP layer peer for the UE host is located in the gateway node. The gateway node provides an IP interface towards an external multicast router so that the UE host looks like a normal IP host supporting IP multicasting. The IP-based voice traffic is mapped and transferred over pre-established connections between the gateway and the UEs of the specific group.

11 Claims, 1 Drawing Sheet

U.S. PATENT DOCUMENTS

| | | | |
|---|---|---|---|
| 6,965,767 B2 * | 11/2005 | Maggenti et al. | 455/416 |
| 7,065,058 B1 * | 6/2006 | Korus | 370/312 |
| 7,301,934 B1 * | 11/2007 | Casati et al. | 370/352 |
| 2002/0034935 A1 * | 3/2002 | Bjelland et al. | 455/403 |
| 2002/0172339 A1 * | 11/2002 | Creswell et al. | 379/201.01 |
| 2002/0196781 A1 * | 12/2002 | Salovuori | 370/352 |

FOREIGN PATENT DOCUMENTS

| | | |
|---|---|---|
| EP | 1 130 894 | 9/2001 |
| WO | WO 97/48210 | 12/1997 |
| WO | WO 00/57601 | 9/2000 |
| WO | WO 00/70825 | 11/2000 |
| WO | WO 01/45330 | 6/2001 |
| WO | WO 01/67674 | 9/2001 |
| WO | WO 01/67787 | 9/2001 |

* cited by examiner

IP BASED VOICE COMMUNICATION IN A MOBILE COMMUNICATIONS SYSTEM

This is the U.S. National Stage of International Application No. PCT/FI01/01093, which was filed in the English language on Dec. 13, 2001, and which designated the U.S.

FILED OF THE INVENTION

The invention relates to mobile communication systems, and especially to IP based voice communication in a mobile communications system.

BACKGROUND OF THE INVENTION

Mobile communications system refers generally to any telecommunications system which enables a wireless communication when users are moving within the service area of the system. A typical mobile communications system is a Public Land Mobile Network (PLMN). Often the mobile communications network is an access network providing a user with a wireless access to external networks, hosts, or services offered by specific service providers.

Third generation (3G) mobile systems, such as Universal Mobile Communications system (UMTS) and Future Public Land Mobile Telecommunications system (FPLMTS) later renamed as IMT-2000 (International Mobile Telecommunication 2000), are being developed. The 3G architecture comprises a radio access network RAN and a backbone network CN, which together provide a bearer network. The RAN provides the radio interface and the physical radio resources for user equipments UE. The RAN may be based on the UMTS terrestrial radio access network (UTRAN) or the EDGE, for example. The RAN is connected to one or more backbone or core networks CN which provide various telecommunications services, such as data, speech and messaging services. The CN may be a circuit switched (CS) domain network, such as a GSM (Global System for Mobile communication) based network, or a packet switched (PS) domain network, such as GPRS. The PS backbone network will provide the UE with Internet Protocol (IP) connectivity services called PS connectivity services herein. Thus, the UE can establish an IP connection to any IP host, IP network or IP service via the 3G access network.

One core or backbone network candidate is the general packet radio service GPRS which was initially developed for the GSM system. The GPRS infrastructure comprises support nodes such as a GPRS gateway support node (GGSN) and a GPRS serving support node (SGSN). As illustrated in FIG. 1, a SGSN1 is connected to the RAN so that the SGSN1 can provide a packet service for mobile user equipments. The intermediate RAN provides a radio access and a packet-switched data transmission between the 3G-SGSN and user equipment UE (mobile station). The GPRS backbone network is in turn connected to an external data network, e.g. to a public switched data network PSPDN, via GPRS gateway support nodes GGSN. The GPRS service thus allows packet switched data transmission to be provided between mobile data terminals and external data networks when the UTRAN (or the GSM) network functions as a radio access network RAN.

The main functions of the SGSN are to detect new GPRS mobile stations in its service area, handle the process of registering the new UEs along with the GPRS registers, send/receive data packets to/from the UE, and keep a record of the location of the UEs inside its service area. The subscription information is stored in a GPRS register (HSS, Home Subscriber Server). In order to access the GPRS services, a UE shall first make its presence known to the network by performing a GPRS attach. This operation establishes a logical link between the UE and the SGSN. More particularly, when the MS attaches to the GPRS network, i.e. in a GPRS attach procedure, the SGSN creates a mobility management context (MM context), and a logical link LLC (Logical Link Control) is established between the UE and the SGSN in a protocol layer. MM contexts are stored in the SGSN and UE. The MM context of the SGSN may contain subscriber data, such as the subscriber identity and location and routing information, etc.

The main functions of the GGSN nodes involve interaction with the external data networks. The GGSN may also be connected directly to a private corporate network or a host. The GGSN includes PDP addresses and routing information, i.e. SGSN addresses for active GPRS subscribers. The GGSN updates the location directory using routing information supplied by the SGSNs. The GGSN uses the routing information for tunnelling the protocol data units PDU from external networks to the current location of the UE, i.e. to the serving SGSN. The tunneling means that the data packet is encapsulated into another data packet during transfer from one end of the tunnel to another. The GGSN also decapsulates data packets received from UEs and forwards them to the appropriate data network. In order to send and receive GPRS data, the UE shall activate the packet data address that it wants to use, by requesting a PDP activation procedure. This operation makes the UE known in the corresponding GGSN, and interworking with external data networks can commence. More particularly, one or more PDP context is created in the MS and the GGSN and the SGSN, and stored in the serving SGSN in connection with the MM context. The PDP context defines different data transmission parameters, such as the PDP type (e.g. X.25 or IP), PDP address (e.g. IP address), quality of service QoS and NSAPI (Network Service Access Point Identifier). Two associated PDP contexts in different GSN nodes define a GTP tunnel. The tunnel is identified with a Tunnel ID (TID) which consists of an MM Context ID and the NSAPI. The UE activates the PDU context with a specific message, Activate PDP Context Request, in which it gives information on the PDP type, PDP address, required QoS and NSAPI, and optionally the access point name APN. The SGSN sends a create PDP context message to the GGSN which creates the PDP context and sends it to the SGSN. The SGSN sends the PDP context further to the UE in an Activate PDP Context Response message, and a virtual connection or link between the UE and the GGSN is established. The PDP context is stored in the UE, the SGSN and the GGSN. As a result the SGSN tunnels all the data packets from the UE to the GGSN, and the GGSN tunnels to the SGSN all data packets received from the external network and addressed to the UE.

ETSI 3GPP (European Telecommunications Standards Institute, $3^{rd}$ Generation Partnership Project) specifications include IP based voice communications in release 2000 (in so called all-IP network), 3G TR 23.821 V1.0.1. In such an all-IP network it will be possible to perform also voice communication in IP network (voice over IP, VoIP). However, also for VoIP, call control signaling are specified, such as SIP and H.323. So, there is a call control signaling used for controlling the connection between the communication parties, as is also the case in the circuit switched voice communication. The element that performs the call control function in the IP network environment is typically called a call processing server. In addition, there are some additional requirements for the voice packet delivery because of the real time nature of the voice communication. Protocols such as RTP (Real Time transport Protocol) and QoS mechanisms are needed to handle that.

TETRA (Terrestrial Trunked Radio) is a standard defined by ETSI (European Telecommunications Standards Institute) for digital professional mobile radio or private mobile radio (PMR) systems. The TETRA system is developed primarily for professional and governmental users, such as the police, military forces, oil plants, etc. Group communications with a push-to-talk feature is one of the essential features of the TETRA network. It is characterized by extreme QoS requirements. Generally, in group voice communication with a "push-to-talk, release-to-listen" feature a group call is based on the use of a pressel (tangent) in a telephone as a switch: by pressing a pressel the user indicates his desire to speak, and the user equipment sends a service request to the network. The network either rejects the request or allocates the requested resources on the basis of predetermined criteria, such availability of resources, priority of the requesting user, etc. At the same time connection is also established to all other active users in the specific subscriber group. After the voice connection has been established, the requesting user can talk and the other users listen on the channel. When the user releases the pressel, the user equipment signals a release message to the network, and the resources are released. Thus, the resources are reserved only for the actual speech transaction or speech item.

The group communication implemented independently in IP-based 3G mobile communications networks would be an interesting feature. In the future, the all-IP network may be an option also in the TETRA. As noted above, voice communication development in the main stream 3G side is going towards the VoIP. The VoIP would be the most obvious candidate also for the group communication feature in the 3G mobile systems. The call control of the group communication is also likely to be based on the VoIP signaling procedures and call processing server implementations. The general guidelines of ETSI standardization for the UE to network protocols in the all-IP 3G systems require that the protocols shall, as far as possible, conform the IETF "Internet standards", such as SIP signaling, in order to achieve access independence and to maintain a smooth co-operation with wireline terminals across the Internet. However, an implementation which is based on the VoIP signaling may not meet the QoS requirements of the push-to-talk group communication. Especially the need for quick connection establishment is considered to be a challenge in the IP network environment. Further, it would be advantageous to be able to implement the group communication feature in the 3G all-IP network independently of the IP voice communication method selected and the call processing server implementation and signaling procedures specified for it.

SUMMARY OF THE INVENTION

An object of the invention is a method and a mobile communication system which allow an IP-based group communication to be implemented independently of the signaling procedures of the IP voice communication method selected.

This and other objects and advantages of the invention are achieved by means of a method and an arrangement according to the independent claims 1 and 8, respectively. The preferred embodiments of the invention are disclosed in the dependent claims.

According to the invention, IP-based group communication feature in a mobile communication network will be based on the preestablished logical connections within the groups. In other words, logical connections are established between a gateway node and members of a group in the mobile communication network, preferably by using the similar procedure as that used for the normal logical data connection. No separate call establishment procedures using VoIP signaling, such as SIP or H.323 are used for connecting a user equipment logically to group(s), but the procedure is preferably based on the normal logical connection establishment signaling (e.g. PDP context creation) as used for data service, with minor additions. Registration to the group communication (e.g. PDP context activation) establishes the logical connection of a user to a group, meaning in the packet switched environment that participants are ready to communicate with each other. An IP multicasting is adapted to such a network environment in such a way that the user equipment (UE) side implements a host supporting the IP multicasting, and the next IP layer peer for the UE host is located in the gateway node. The gateway node provides an IP interface towards an external multicast router so that the UE host looks like a normal IP host supporting IP multicasting, including the registration procedures to a multicast group. Within the mobile communications system, the IP-based voice traffic is mapped to and transferred over the pre-established connections between the gateway and the UEs of the specific group.

The information mapping the IP multicast addresses and the group identifiers may be maintained in the gateway or in a separate node in the mobile communications system. In an embodiment of the invention this information is maintained in an external node which may be located, for instance, in a corporate network of an enterprise whose employees are members of the group. This arrangement allows the enterprise to allocate multicast addresses in a more flexible manner. The gateway requests the multicast address for the group identifier from the external node, when the first logical connection for the group is established. In one embodiment of the invention the external node is embodied as a domain name server.

In the preferred embodiment of the invention the logical connection comprises a Packet Data Protocol (PDP) context for each user registered to the group, the group identifier identifying the PDP contexts belonging to the same group. The gateway preferably supports the IP multicasting procedures between the gateway node and the IP multicasting server, and converts group registrations made in a PDP context layer into IP multicast registrations in the IP user layer. A set of groups may be identified by means of an Access Point Name (APN). The APN determines the external system, e.g. IP multicast router, to which the gateway should connect the group call. The APN may also be used for identifying the external node from which the multicast address is to be requested on the basis of the group identifier.

BRIEF DESCRIPTION OF THE DRAWINGS

In the following, the invention will be described in greater detail by means of preferred embodiments with reference to the accompanying drawings, in which.

PREFERRED EMBODIMENTS OF THE INVENTION

The present invention can be applied to any packet mode mobile communications systems. The invention can be especially preferably used in mobile communications systems based on a GPRS-type packet radio. In the following, preferred embodiments of the invention will be described by means of a GPRS service and the UMTS or GSM system without limiting the invention to this particular packet radio system. The IP voice communication method used in the preferred embodiments of the invention is the Voice over IP (VoIP), but the invention is not limited to this particular method.

Figure 1:
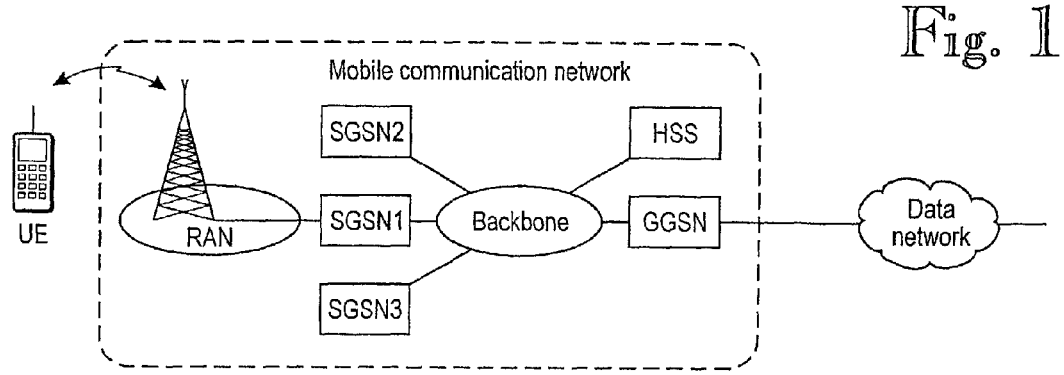
FIG. 1 illustrates a prior art 3G mobile communications system.
Figure 2:
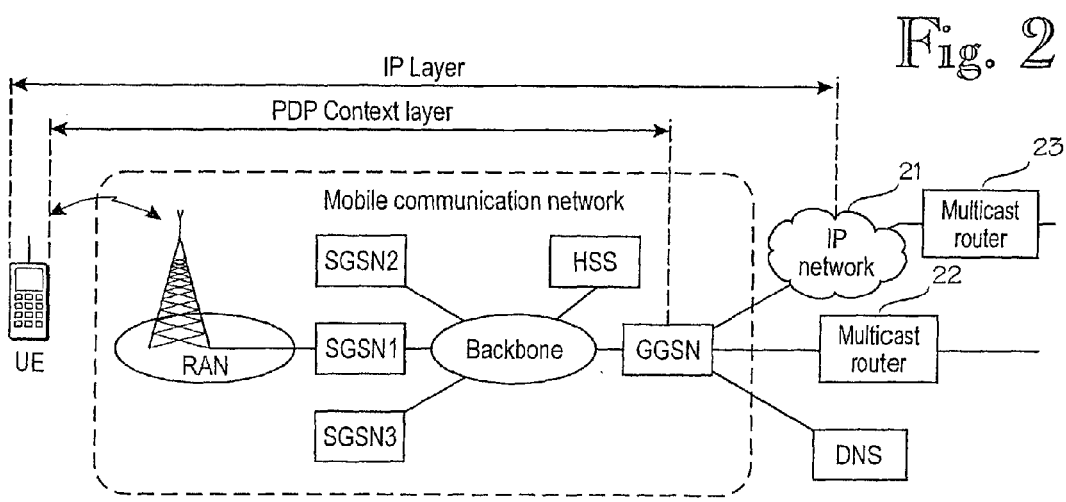
FIG. 2 illustrates a mobile communications system according to the present invention.

A mobile communication system according to the invention based on a GPRS architecture utilizing a 3G radio access network RAN (such as UMTS) or a 2G radio access network RAN (such as GSM base station system BSS) is illustrated in FIG. 2. The basic architecture and operation of GPRS have already been described above with reference to FIG. 1. In FIG. 2, the GGSN is connected to at least one IP network 21, and to an IP multicast router 22. Another multicast router 23 is connected to the IP network 21 which supports IP multicasting. It should be understood that IP network may be any public or private IP network, or combination thereof, i.e. Internet. In the invention point of view, transmission plane is divided into four parts: a mobile User equipment (UE), Radio Access Network (RAN), a backbone network (e.g. the GGSN), and a multicast router. A control plane includes some kind of group database, which may be, for example, extension to standard 3G Home Subscriber Server (HSS) that provides access control for groups, and Domain Name Server (DNS) that maps together the information that GGSN uses in the PDP context layer and in the IP layer. The DNS may be part of the mobile communications network, or an external server, for example in the customer's corporate network or in the external service provider's network.

The term "group", as used herein, refers to any logical group of three or more users intended to participate in the same group call. The groups are created logically, i.e. a special group call information maintained on the network side associates specific user to a particular group call group. This association can be readily created, modified or canceled. A single user may be a member in more than one group call group. Typically, the members of the group call group belong to the same organization, such as the police, the fire brigade, a private company, etc. Also typically, a single organization has several separate groups, i.e. a set of groups.

As noted above, the IP-based group communication feature according to the invention is based on the pre-established logical connections within the groups. In the GPRS-type environment, the group communication feature uses a dedicated PDP context. In order to be able to start the communication, a user registers to the group communication service, and a PDP context is established for the user. As also explained above, two associated PDP contexts in different GSN nodes define a GTP tunnel therebetween. A separate PDP context is established for the groups that use different APN or QoS. Although physical resources at the air interface (between the RAN and the UE) are reserved only for the actual data transfer, a PDP context can typically be active for long periods of time, thus providing virtually the "always-on" connectivity. This feature can be utilized with the virtually "always-on" nature of the IP communication so that the opening time of the communication path is small. The mechanisms for this process shall be optimized to allow very fast start of the communication, which is especially advantageous if the push-to-talk communication is used. The QoS settings may help in the voice packet delivery, which is one critical part also at the starting phase of the communications, but also other aspects, such as reservation of physical resources in the air interface, shall allow the fast communication start. However, the reservation of physical resources in the air interface can be seen as a network environment specific mechanism which allocates capacity for the IP traffic, being in that sense a transparent (or lower level) action for the IP communication itself. Thus, the resource reservation is not a relevant part of this invention, but is only required to be taken into account in the practical implementation.

A set of groups is identified by the Access Point Name (APN) in the PDP context activation message in the corresponding way as the APN is used in the "normal" PDP context activation that establishes a logical data connection to a target data network. A specific group within a set of groups is identified by a separate identifier, Group Identifier. Sets of groups within the group communication service form a structure for logically separate groups, and explicit APN is defined for each set of groups. Thus, there is a two level hierarchy for organizing the groups in the group communication feature.

For each mobility management context there may be none, one or several active PDP contexts, having different or shared PDP (IP) addresses. For a preferred embodiment of the invention, relevant information of the "group" PDP context may include a PDP address (unicast IP address of the UE), TFT (Traffic Flow Template) identifying TFT used by the group, NSAPI (Network Access Service Point Identifier) identifying the separate PDP contexts of the same UE and, Access Point Name (APN) that identifies a set of groups. These four elements as such are already part of the standard 3G implementation, but some of them are used for a new purpose in the present invention. In addition, an identifier is needed to identify a group within the set of groups and also in the IP layer. The Group Identifier mentioned above is used for the former purpose and a multicast IP address of the group for the latter one. A UE registers to a group by using an APN+Group Identifier pair as input parameters, and receives the multicast IP address upon registration (PDP context activation). Different groups within a set of groups that use different multicast IP addresses and have different Group Identifiers may share the same TFT if they have the same QoS. The mobile communications system may have defined several TFTs with different QoS.

In order to separate the mechanisms used between the MS and GGSN from the mechanisms that are IP layer mechanisms, the former one is named as the "PDP context layer" and the latter one the "IP layer". In the example illustrated in FIG. 2, the IP layer provides a layer between the user application (VoIP communication application) in the UE and the application in the IP multicast router 22 or 23. The underlying PDP context layer provides a logical path for the IP layer through the mobile communication network (between the UE and the GGSN). IP multicasting implement logical channels between the GGSN and the multicast router 22, and in the IP layer of the UE.

In the PDP context layer, the PDP context itself identifies both the sending and receiving parties. The APN+Group Identifier pair forms the logical association in the GGSN between the PDP contexts belonging in the same group. PDP context is bound to a specific Access Point and one or more Group Identifiers and the derived multicast addresses. At the IP layer, unicast IP address of the UE defines the sending party and multicast IP address of the group identifies the receiving parties (source and destination of the IP packets). IP layer may also combine several Group identifiers under the different APNs into the same IP layer group.

In a preferred embodiment, the IP multicast is adapted to a mobile network environment so that the UE side implements a host supporting the IP multicasting, and the next IP layer peer for it is located in the GGSN. GGSN provides an IP interface towards a multicast router 22 or 23 so that the UE host appears like a normal IP host supporting IP multicasting, including the registration procedures to a multicast group. When the PDP context has been established and the corresponding multicast address(es) received by a UE, the registration to the multicast group(s) is(are) (preferably automatically) activated in the UE. The registration takes place in a normal way at the IP layer. Thus, the PDP context activation makes the multicast address <=> PDP context mapping, and the IP multicast group registration activates the host IP layer and the multicast router. Another alternative would be to make the registration on the network side as early as upon the PDP context activation and activate the IP stack of the UE in some way after that. The GGSN may also be capable to handle part of the traffic internally without a multicast router. In that case, a multicast address derived from the APN+Group Identifier pair (that-identifies a group) points in the GGSN to a set of PDP contexts where they are within the same GGSN area, and to a certain multicast router concerning the PDP contexts that are outside that GGSN area. The IP layer may combine group identifiers accessed via different APNs into the same multicast group. Also members connected via different type of networks, e.g. fixed network, may be combined as part of the multicast group if or when feasible from the overall service implementation point of view. The traffic flowing out/in from/to the mobile communications network via the GGSN is handled in accordance with standard IP towards the multicast routers 22 and 23, and the GGSN converts the procedures, e.g. the group registrations (if not done in the IP layer), in the PDP context layer into the multicast group procedures, e.g. registrations, in the IP layer with the help of the DNS server.

On the control plane a Home Subscriber Server HSS (e.g. standard 3G HSS with some extension) provides an access control of IMSIs (International Mobile Station Identity) to specific APN+Group Identifier pairs. The HSS shall include the information about the groups, namely: APN+Group Identifier and allowed IMSIs. Or alternatively, if the information is arranged on the basis of IMSIs: allowed APN+Group Identifier pairs per IMSI.

Thus, when the PDP context is activated, IMSI, unicast IP address, TFT, NSAPI, APN, Group Identifier(s) and multicast IP address(es) are bound together to form the logical channels including also the linkage between the IP and PDP context layers. The multicast IP address is not used for logical channel handling nor mobility management purposes between the UE and the GGSN. It is used in the IP layer in the UE and in the GGSN.

In a preferred embodiment of the invention, the APN and the Group Identifier are domain names. The APN+Group Identifier pair is a domain name corresponding to the multicast IP address of a specific group. So, the multicast IP address of a group is provided by the DNS server based on a domain name "APN+Group Identifier". The APN is a domain name corresponding to an IP address of a specific GGSN providing the access point to the right multicast router. Another implementation alternative is such that the Group Identifier is an explicit domain name which directly corresponds to a specific group. An advantage to use domain names to identify groups is to make the IP multicasting and PDP context layers as transparent to each other as possible.

Other alternatives than using domain names to correspond the IP multicast address are not excluded. In such a case the multicast IP addresses may be stored in the HSS. A special case is to use the multicast IP address also in the PDP context layer in the way that the multicast IP address would carry information intended both to PDP context activation (using the multicast IP address from the IP perspective in a dummy way just as an identifier) and to the IP layer.

It is also possible that there is a pool of available multicast addresses which are allocated dynamically to the groups on demand. Then also the mapping between the multicast address and the group identifier may be created dynamically when the first PDP context for the group is created.

Figure 3:
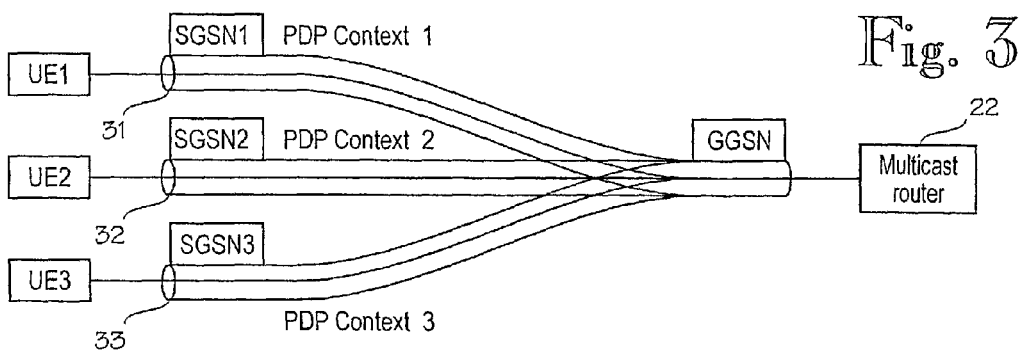
FIG. 3 illustrates the logical connections established for the group voice communication.

The establishment of the IP group communication will be illustrated by means of an example with reference to FIG. 3. Let us assume that an organization which controls the multicast router 22 has created a communication group X. A unique APN+Group Identifier pair has been assigned to the group X in the mobile communications system. The information on which UEs (IMSIs) are members of the group X is stored in the HSS. The information mapping a domain name "APN+Group Identifier" to the corresponding multicast IP address of a group is stored in the DNS server.

FIG. 3 is a graphical illustration of group X having three registered users UE1, UE2 and UE3 with PDP contexts 1, 2 and 3, respectively. For purposes of clarity, the UEs 1, 2 and 3 have different SGSNs 1, 2 and 3, respectively, but the UEs may naturally all be under the same SGSN. Let us further assume that the UEs 2 and 3 are already registered to the group in the GGSN. Now, a new UE1 starts registration by sending a Create_PDP _context request with the "APN+ Group Identifier" pair. The SGSN or the GGSN checks from the HSS whether the UE1 is allowed to access the group X. If the access is allowed, a PDP context 1 is created for the UE1. This PDP context 1 is associated to other PDP contexts 2 and 3 of the group X by means of the group identifier. The GGSN has retrieved the multicast IP address from the DNS server on basis of the domain name "APN+Group Identifier" already when the first UE registered to the group X. Each of the PDP contexts 1, 2 and 3 form a logical connection or tunnel 31, 32 and 33, respectively, through the mobile communications network. The logical connections 31, 32 and 33 are joined on the GGSN side by means of the "APN+Group Identifier" pair. The logical connections 31, 32 and 33 are further linked to a multicast IP address used by the multicast router for the group X. Thus, the users UE1, UE2 and UE3 are ready to send or receive VoIP packets that are part of the group communications.

Let us now assume that the user UE1 desires to talk. If the push-to-talk feature is in use, the user presses the pressel (or performs any other corresponding action to indicate his desire to talk), and a service request is sent to the network. The communication path, including the channel resources in the air interface at the sending and receiving ends, is needed to be opened, if not already open. The resources may remain occupied for some silent period after a completed speech item, so a new speech item may or may not require a new resource reservation. Flexible implementation would allow the duration of the silent period for which the resources remain occupied to be set optimally. Call set-up signaling is not needed at the resource reservation phase, because the logical connections already exist with the active PDP context, but the physical resources are reserved and opened by using the signaling procedures similar to the normal data service in the corresponding state. The QoS settings that provide high priority for the packet delivery relative to other applications can be utilized for the PDP contexts used in group communications. An alternative would also be to assign different types of QoS settings to different group PDP contexts, thus making it possible to assign better QoS to the most critical groups.

The VoIP packets related to the speech item of the user UE1 are tunneled through the logical connection 31 to the GGSN which then forwards the VoIP packets to the multicast router 22. The multicast router 22 routes the VoIP packets to the members of the group X. As a consequence, VoIP packets provided with the multicast address are received from the multicast router 22 also by the GGSN. The GGSN finds the mapping between the multicast address and the PDP contexts 1, 2 3 and sends copies of the VoIP packets to the UE2 and UE3 through the logical connections 32 and 33. No copies are sent to the UE1, since the unicast IP address of the UE is the source address in the VoIP packets. The GGSN may also be capable to handle part of the traffic internally without routing the traffic via the multicast router 22. After the user UE1 has ended the speech item, he releases the pressel, and the end of the speech item is indicated to the network. Finally, the reserved resources are released either immediately or after the silent period described above.

The examples described above assume a simplified model where there is always only one sending party and one or multiple receiving parties at a time, and the communication is characterized by a quick start of communication. The mechanisms implementing the complete group communication feature in the real environment built on top of the inventive "service" may, however, include e.g. the approach where the allocation of turns for the group members to talk one at a time would be managed, the approach where the packets are discarded by the network with pre-defined rules, taking care that only one party is talking (packets originated from that member are transferred) at a time, or the approach which allows multiple concurrent talking parties.

In the following, some possible alternatives for the UE registration to the group communication service are given.

When a UE registers to the network (a general service), the PDP contexts for the UE are automatically established to the groups belonging to the set of groups A, B and C.

When a UE registers to the network (a general service), nothing happens concerning the group communication. The user needs to register separately to the group communication service, and when he does so, PDP contexts for the UE are established to the groups belonging to the set of groups A, B and C.

When a UE registers to the network (a general service), nothing happens concerning the group communication. The user needs to register separately to each set of groups he is allowed to participate in, and when he does so for the set of groups A, a PDP context is established for the UE to the groups A1, A2 and A3.

When a UE registers to the network (a general service), nothing happens concerning the group communication. User needs to register separately to each group he is allowed to participate in, and when he does so for the group A2, a PDP context is established for the UE to the group A2.

cases the PDP context activation may be either UE or network originated, and is based on the same type of signaling as the other PDP context activations.

When a user participates in the communication in the specific group the user may act in either one of the following ways:

A user selects the group in which he wants to speak, from the groups for which MS has active PDP contexts.

A user may scan several groups or select one group, and it is also possible that some prioritization rules may overrule the selection made by a user.

When a user has selected-the group A1 and starts to speak, he pushes the push to talk button, which triggers the signaling to reserve the physical resources in the network (if not already reserved), and the first VoIP packet may be transmitted when the communication path, is open.

The description only illustrates preferred embodiments of the invention. The invention is not, however, limited to these examples, but it may vary within the scope and spirit of the appended claims.

The invention claimed is:

1. A method comprising:
creating at least one group of user nodes for internet protocol based group communication in a mobile communications system, each group having a group identifier and a multicast address for identifying the group, wherein the multicast address of the group is also utilized as a group identifier;
pre-establishing separate packet data protocol contexts between a network apparatus and each user node registered to the group, wherein a user node is registered to a group based upon at least an access point name indicated in a registration request received from the user node, wherein pre-establishing separate packet data protocol contexts comprises creating a packet data protocol context for each user node registered to the group, and establishing logical connections between the network apparatus and the user nodes registered to the group;
mapping, by the network apparatus, the packet data protocol contexts to the multicast address of the group;
routing, by the network apparatus, packets addressed to the multicast address of the group, wherein the packets addressed to the multicast address are transferred over the packet data protocol contexts mapped to the multicast address of the group; and
supporting internet protocol multicasting procedures between the network apparatus and an internet protocol multicasting server, comprising converting, by the network apparatus, group registrations made in a packet data protocol context layer into internet protocol multicast registrations in an internet protocol user layer.

2. The method according to claim 1, wherein, the group identifier is identifying the packet data protocol contexts belonging to the same group.

3. The method according to claim 2, comprising identifying
a set of groups by means of an access point name.

4. The method according to claim 1, comprising
the network apparatus requesting the multicast address for the group identifier from another node in the mobile communications system when a first packet data protocol context for the group is pre-established.

5. The method according to claim 4, wherein group registration in the packet data protocol layer contains the group identifier and an access point name-which identifies said another node.

6. An apparatus comprising
at least one processor; and
at least one memory including computer program code, where the at least one memory and the computer program code are configured, with the at least one processor, to cause the apparatus to at least:
create at least one group of user nodes for internet protocol based group communication in a mobile communications system, each group having a group identifier and a multicast address for identifying the group, wherein the multicast address of the group is also utilized as a group identifier;

pre-establish separate packet data protocol contexts between a gateway node and each user node registered to the group, wherein a user node is registered to a group based upon at least an access point name indicated in a registration request received from the user node, wherein pre-establishing separate packet data protocol contexts comprises creating a packet data protocol context for each user node registered to the group, and establishing logical connections between the gateway node and the user nodes registered to the group;

map the packet data protocol contexts to the multicast address of the group; and route packets addressed to the multicast address of the group, wherein the packets addressed to the multicast address are transferred over the packet data protocol contexts mapped to the multicast address of the group; and support internet protocol multicasting procedures between said gateway node and an internet protocol multicasting server, wherein said gateway node is arranged to convert group registrations made in a packet data protocol context layer into internet protocol multicast registrations in an internet protocol user layer.

7. The apparatus according to claim 6, wherein the group identifier is identifying the packet data protocol contexts belonging to the same group.

8. The apparatus according to claim 7, wherein an identifier for a set of groups comprises an access point name.

9. The apparatus according to claim 6, comprising said gateway node being arranged to request the multicast address for the group identifier from another node in the mobile communications system when a first packet data protocol context for the group is pre-established.

10. The apparatus according to claim 9, wherein the group registration in the packet data protocol layer contains the group identifier and an access point name which identifies said another node in the mobile communications system.

11. The apparatus according to claim 9, wherein the another node is a domain name server.

* * * * *